United States Patent [19]

Message

[11] Patent Number: 4,766,987

[45] Date of Patent: Aug. 30, 1988

[54] SPRING FOR A FREE-WHEEL DEVICE AND ASSEMBLY COMPRISING SUCH A SPRING

[75] Inventor: Olivier Message, Antony, France

[73] Assignee: SKF Compagnie d'Applications Mechaniques, Clamart, France

[21] Appl. No.: 877,648

[22] Filed: Jun. 23, 1986

[30] Foreign Application Priority Data

Jun. 24, 1985 [FR] France ................................. 85 09583

[51] Int. Cl.⁴ ............................................. F16D 41/07
[52] U.S. Cl. .................................. 192/41 A; 192/45.1
[58] Field of Search ............................ 192/41 A, 45.1; 188/82.8

[56] References Cited

U.S. PATENT DOCUMENTS

| 2,630,896 | 3/1953 | Dodge | 192/45.1 |
| 2,744,598 | 5/1956 | Troendly | 192/45.1 |
| 2,753,027 | 7/1956 | Troendly et al. | 192/45.1 |
| 2,777,551 | 1/1957 | Banker | 192/45.1 |
| 2,824,635 | 2/1958 | Troendly et al. | 192/45.1 |
| 2,904,148 | 9/1959 | Schneider et al. | 192/45.1 |
| 2,912,086 | 11/1959 | Troendly et al. | 192/45.1 |
| 2,923,388 | 2/1960 | Nielsen | 192/45.1 |
| 2,973,072 | 2/1961 | Ferris | 192/45.1 |
| 3,219,163 | 11/1965 | Zlotek | 192/45.1 |
| 3,743,066 | 7/1973 | DeLavalette et al. | 192/41 A |
| 4,114,739 | 9/1978 | Colonna et al. | 192/41 A |

FOREIGN PATENT DOCUMENTS

| 928560 | 6/1955 | Fed. Rep. of Germany . |
| 1142254 | 1/1963 | Fed. Rep. of Germany . |
| 1450157 | 4/1969 | Fed. Rep. of Germany . |
| 1625744 | 1/1970 | Fed. Rep. of Germany . |
| 3321358 | 12/1984 | Fed. Rep. of Germany . |
| 1408026 | 9/1964 | France . |
| 2144067 | 2/1973 | France . |
| 2342429 | 9/1977 | France . |
| 2385948 | 10/1978 | France . |
| 2486606 | 1/1982 | France . |
| 2084671 | 4/1982 | United Kingdom . |

Primary Examiner—Rodney H. Bonck
Assistant Examiner—Richard M. Lorence
Attorney, Agent, or Firm—Beveridge, DeGrandi & Weilacher

[57] ABSTRACT

Spring for a free-wheel device with wedging cams, of the type comprising a series of main undulations (8) provided with apertures (9) for allowing the cams (2) to pass through and for holding them, and a plurality of tilting tongues (12) each acting on one of the side faces of a cam in the direction assisting the wedging action, characterized in that the rear edge of each aperture has a flat portion (10) folded back towards the outside and capable of bearing against a surface portion (22) of the rear side of the cam, the tilting tongue (12) being located on the side where the front edge of the aperture (9) is located.

18 Claims, 5 Drawing Sheets

SPRING FOR A FREE-WHEEL DEVICE AND ASSEMBLY COMPRISING SUCH A SPRING

The present invention relates to a spring having a general cylindrical shape, which may be used in a free-wheel device with wedging cams. The spring is provided with apertures through which the wedging cams pass and is intended to act on each of these cams when the latter are engaged between an internal sliding track and an external sliding track of a free-wheel device with wedging cams. The said wedging cams are, moreover, preferably engaged in apertures of a cage.

A certain number of embodiments of such springs which bear against the side faces of the cams of a free-wheel device are already known.

It is possible to cite, for example, U.S. Pat. Nos. 2,744,598 and 2,753,027 in which a spring with a general cylindrical shape has undulations and apertures, the cams being gripped between the two sharp edges of the apertures.

It is also possible to cite U.S. Pat. Nos. 2,824,635, 2,630,896 and 2,777,551 or German Pat. Nos. 928,560 and 1,142,254, in which the cams are introduced into apertures of a spring having a general cylindrical shape, the cams being gripped between a sharp edge of the aperture and an inwardly or outwardly curved end of a tilting tongue improving operation of the free-wheel device and tilting of all the cams in the wedging direction. U.S. Pat. No. 2,912,086 describes a device of the same type, but also provides for the use of two cages in order to facilitate synchronization of all the cams.

It is also possible to cite U.S. Pat. No. 3,219,163 and French Pat. No. 2,144,067 which describe tilting tongues which are folded back and which bear against bosses integral with the wedging cams.

None of these known devices is able to allow precise angular orientation of the wedging cams before they are mounted between a bore and a shaft. In fact, in these known devices, the cams do not bear against any bearing surface having a precise angular orientation.

This gives rise to practical difficulties when it is required to mount the assembly consisting of the cams, the springs and, if necessary, one or more cages, between the bore and the shaft. Assembly of the free-wheel device is generally performed in two operations. First of all, the assembly consisting of the spring, if necessary one or more cages and all the cams is mounted inside the bore of the external sliding track. The shaft constituting the internal sliding track is then arranged in position. For certain applications, the same operations may be performed in the reverse order.

In all cases, any lack of precision in the angular position of the various cams in the unrestricted state, before being mounted, gives rise to impreciseness in the diameter of the ring formed by all the various wedging cams, thereby making it difficult to mount them between the corresponding sliding tracks. In order to overcome these assembly difficulties, it is generally necessary to provide very marked entry chamfers on the internal and external sliding tracks, as a result of which parts with larger dimensions must be provided. Moreover, despite these chamfers, assembly difficulties occur on account of certain cams which are incorrectly positioned becoming jammed axially, thereby making the completely automated assembly of such free-wheel devices practically impossible.

Moreover, the known free-wheel devices are subject to difficulties, during operation, in the event of eccentricity between the bore and the shaft of the free-wheel device. When, in fact, the value of the gap or clearance between the internal and external sliding tracks is increased, the inclination of the cams in the free-wheel position, hence just before wedging and before the torque is taken up, increases. The angle of tilt of the cam increases further as the torque increases and even risks exceeding a limit value beyond which the cam tilts in an irreversible manner and can no longer return into a position where wedging is possible. This phenomenon, which is sometimes referred to as the "tilt over" phenomenon, leads to rapid wear of the free-wheel device.

In the free-wheel devices of the conventional type described in the aforementioned documents, which generally use one or more cages, a spring device and a plurality of cams, there are no means which make it possible to prevent excessive tilting of the cams before the torque is taken up in the event of the clearance exceeding a predetermined value, for example owing to excessive eccentricity between the internal and external sliding tracks.

The operation of free-wheel devices of the conventional type has also brought to light another drawback. In devices such as those described in the aforementioned patents, solely the tilting tongues acting on the cams must absorb and dampen unsynchronized movements of the cams, which sometimes occur in practice. It is known, in fact, from experience that, in certain conditions, certain cams which are subject to loading, may start to slip, i.e. may be suddenly released from their loaded position in the direction of their free-wheel position and may go beyond this position. This risk of slipping, which is sometimes referred to as the "pop out" phenomenon, is promoted by strong axial or torsional vibrations exerted on the free-wheel device. It may also occur if the wedging angle of the cams is very similar to the frictional angle owing to factors relating to wear, deformation or the use of an unsuitable lubricant. Finally, this phenomenon is also promoted by excessive eccentricity of the internal and external sliding tracks.

Since this phenomenon is dampened in devices of the conventional type merely by the tilting tongues acting on the cams, these tongues are subject to excessive fatigue, which frequently gives rise to breakages. French Pat. No. 2,385,948 does in fact make provision for additional bearing lugs which allow the cams to be supported in the event of unsynchronized tilting. However, these lugs make contact solely by means of their end edge and do not assist the tilting tongues by co-operating with a flat bearing surface portion of the cam.

A description has already been provided, in French Pat. No. 2,342,429, of a spring for a free-wheel device with wedging cams and also of the assembly of such a spring with a cage having apertures. In this device, each wedging cam is gripped between the opposite edges of each aperture of the spring, gripping being performed by means of elastic deformation of a secondary undulation provided in the vicinity of the top of a main undulation of the spring. Tilting of the cams towards their angular wedging position is ensured by the action of elastic tilting tongues integral with the spring and acting on a projecting portion close to the base of the cams. Although this arrangement is effective in the applications for which it was designed, it has been noted, however, that certain characteristic features may be improved still further.

In fact, independently of the difficulties already encountered in the aforementioned devices, it has been noted that, in the free-wheel devices described in this document, slight variations in the span of the apertures of the spring produce a diametral variation in the spring after it has been mounted in the bore of the cage. The cams, which are gripped by the spring, follow the diametral fluctuations of the latter. This phenomenon is capable of causing some difficulty when it is required to mount the assembly, consisting of the spring, the cams and the cage, between the two sliding tracks. In particular, it gives rise to the risk of the spring catching on the internal sliding track.

Moreover, it has been noted, in practice, that the positions of the various cams before being mounted are variable so that it is not possible to obtain, with precision, a diametral dimension for all the cams, in the unrestricted state before assembly, which exactly matches the corresponding diameter of the sliding tracks.

Furthermore, it has been noted that retaining the cams by means of gripping between the opposite edges of each aperture of the spring, although it effectively improves synchronization of all the cams during operation, gives rise to a high degree of friction between the cams and the spring, thereby preventing the various cams from having a very short response time to the tilting stresses, which is required in certain applications where the free-wheel device is subjected to high-frequency cycles. It is therefore necessary to use tilting tongues which exert a greater torque, thereby adversely affecting the dragging torque and hence the wear of the cams during free-wheel operation.

The aim of the present invention is to overcome the various drawbacks which have been described and which characterize free-wheel devices according to the present state of the art.

In particular, the aim of the present invention is to facilitate mounting of the assembly, consisting of the spring equipped with its wedging cams and preferably associated with a cage, between the internal and the external sliding tracks.

Another aim of the invention is to improve the safety, during operation, of the free-wheel device, in particular when the torque is taken up, in the event of eccentricity of the internal and external sliding tracks, thereby also improving damping of unsychronized movements of the cams should any slipping occur, without causing excessive wear of the tilting tongues.

Yet another aim of the invention is to enable free-wheel operation such that there is a reduced dragging torque and the cams have a very short response time in the direction of their wedging position, while ensuring that all the cams are properly synchronized.

The spring, according to invention, for free-wheel devices with wedging cams is of the type having apertures for allowing the cams to pass through and for holding them, and a plurality of tilting tongues each acting on one of the side faces of a cam in the wedging direction. According to the invention, the rear edge of each aperture has a flat portion capable of bearing against a flat surface portion of the rear side of the cam, the tilting tongue being located on the side where the front edge of the aperture is located.

In the present description, the term "front" is used to describe the members or parts of the cams or spring which are located on the side where the tilting tongues of the spring make contact with the cams. The term "rear" is used to describe the members located on the opposite side. In addition, the term "inside" or "inner" is used to qualify any portion of a member or any member which is located closer to the axis of symmetry of the free-wheel device during operation than another portion or another member, which will thus be qualified by the term "outer" or "outside".

The flat portion of the rear edge of each aperture makes it possible to define a precise angular position for each of the cams before the latter are mounted between the bore and the shaft. Moreover, in the event of an excessive increase in the clearance owing to eccentricity, it also makes it possible to "neutralise" the cams which, before the torque is taken up, reach a predetermined limit angular position beyond which further tilting of these cams, in the event of the torque increasing, would risk leading to irreversible tilting. The flat portion may be folded back towards the outside or towards the inside, depending on the configurations.

The dimensions of the flat portion of the rear edge of each aperture are preferably such that the end of the said flat portion is able to bear against the dihedral angle formed by two flat-surface portions of the rear side of the cam. Thus, before the spring and the cams are mounted between the bore and the shaft, the flat portion of the rear edge of the aperture bearing against the aforementioned dihedral angle precisely defines the radial position of the cam in relation to the spring, without the cam coming into contact with the edges of the apertures of the cage.

The spring may advantageously have a series of main undulations at the top of which apertures are provided for the cams.

Each tilting tongue is folded back towards the outside and has dimensions such that its end comes into contact with the front side of the cam inside a concave rounded portion provided on the said front side. The dimensions of each aperture of the spring are such that the end of the front edge of the aperture does not come into contact with the front side of the cam during normal operation. The cam is held between the rear edge of the aperture and the tilting tongue.

In the unrestricted state, before mounting between the two sliding tracks, slight prestressing of the tilting tongue engaged inside the rounded portion connecting the front surfaces of the cam is sufficient to keep the lower rear side of the cam bearing against the flat portion of the rear edge of the aperture of the spring, thus ensuring precise angular orientation of the cam, referred to above. Similarly, the pressure of the tilting tongue is such that the cam positions itself in a predetermined radial position, the dihedral angle between the two flat portions of the rear side of the cam bearing against the end of the rear edge of the aperture of the spring. Once in this position, any radial stress applied to the cam from the outside towards the inside or vice versa gives rise to a return force which tends to bring the cam back into its initial predetermined position of equilibrium.

Thus, it is possible to determine precisely the diametral dimensions of all the cams, thereby making it possible to reduce considerably the entry chamfers of the internal and external sliding tracks. Also, owing to this arrangement, a "soft" mounting is achieved, without hard points of contact and without axial jamming of some cams which might not be oriented properly on the entry chamfers. It is possible to mount the assembly so that it is lightly held on either one of the sliding tracks, which often helps make subsequent assembly operations easier. Finally, it becomes possible to make assembly of the free-wheel device completely automated.

In a preferred embodiment, the front edge of each aperture of the spring has a flat portion which is more rigid than the tilting tongue and is capable of bearing against a flat-surface portion of the front side of the cam when the tilting tongue has been deformed.

In this way, the tilting tongue, which may advantageously have a substantially flat portion, may be designed so as to withstand easily the maximum stresses to which it is subjeced. If a cam, which was in a wedged position, suddenly tilts towards the free-wheel position, this tilting action, which is initially dampened by the tilting tongue, is then dampened by the reinforced action of the front edge of the aperture, i.e. of all of the front part of the spring. Thus, the tilting movement of the cams, due to possible slipping, is effectively dampened and stopped, without excessive wear of the tongues.

The slope of the front edge of each aperture is advantageously chosen so that the maximum angle of flexure of the tongue coming into this plane is compatible with the stresses which the tongues are able to withstand without excessive wear. Moreover, the lower front side of the cam is advantageously shaped so as to bear fully against the front edge of the aperture when the cam has exceeded the furthest possible free-wheel position.

The invention also relates to an assembly which has at least one cage having a general cylindrical shape and a plurality of apertures through which the cams pass, a plurality of wedging cams which are introduced into the apertures of the cage and an elastic member having a general cylindrical shape and forming a spring mounted concentrically in relation to the cage and acting on each of the cams, the spring having the structure mentioned above. Moreover, the spring is advantageously precompressed circumferentially inside the bore of the cage. The span of the apertures of the spring in the unrestricted state is chosen so as to be greater than the span of the apertures of the spring after mounting inside the bore of the cage and introduction of the cams into the respective apertures of the cage and the spring.

As a result, the spring, after mounting inside the bore of the cage, has a fixed and known diametral dimension, thereby allowing precise radial positioning of the cams. The dimension of the cage bore is in fact constant and may be easily determined, this not being the case for a spring which is a relatively complex part obtained by means of forming and which undergoes fluctuations in dimensions as a result of the heat treatment to which it is subjected. Owing to this arrangement, the span of the apertures in the spring, which may be variable before being mounted, becomes fixed and clearly defined after mounting inside the bore of the cage. Moreover, better synchronization of all the cams is achieved as a result of the biasing action of the relatively rigid and homogenous assembly consisting of the cage and the spring.

This circumferential pre-compressive action is preferably obtained by mounting the two ends of the spring so that they overlap each other, the flat portions of the rear edges of the two apertures, which are folded back towards the outside, being in contact with each other.

In the case where the spring has, in the vicinity of the top of each of its main undulations, a secondary undulation which is located on either side of the corresponding aperture, the secondary undulations of the two apertures which overlap are in contact with each other and help produce biasing of the spring.

The first end of the spring preferably has a completely closed aperture associated with the tilting tongue, while the second end of the spring has an open aperture which is not associated with an actual tilting tongue. The first end is thus mounted internally, while the second end is mounted externally when the two ends of the spring overlap.

The invention will be understood more clearly by examining a particular embodiment described by way of a non-limiting example and illustrated by the attached drawings in which.

Figure 1:
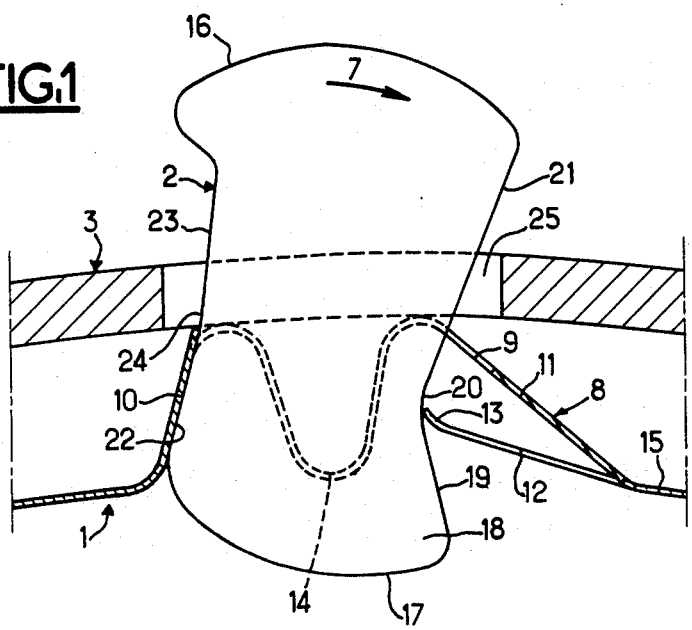
FIG. 1 is a diagrammatic view, in partial cross-section, of an assembly according to the invention comprising a wedging spring, a cage and a plurality of wedging cams, the assembly being shown before being mounted between two concentric sliding tracks.
Figure 2:
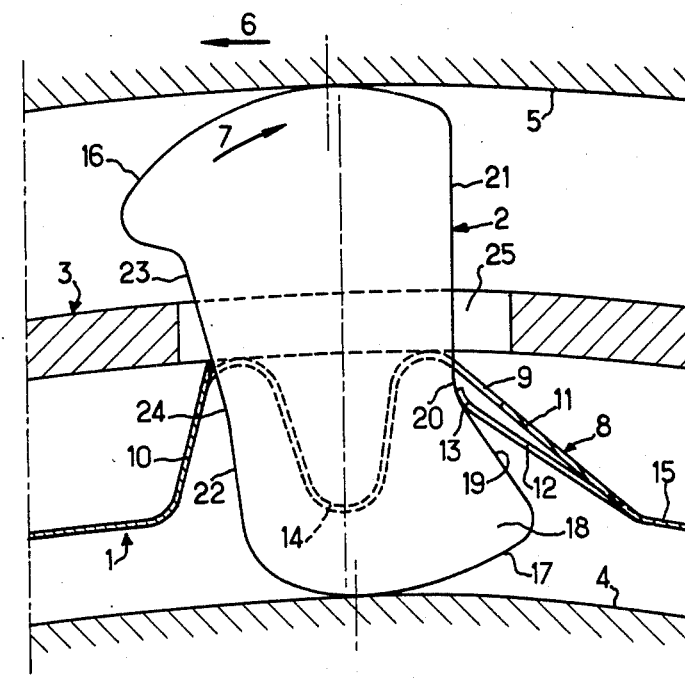
FIG. 2 is a diagrammatic view, in partial cross-section, of a free-wheel device according to the invention, showing one of the wedging cams positioned between an internal sliding track and an external sliding track which are perfectly concentric and without eccentricity, the Figure showing the position of the wedging cam before the torque is taken up, i.e. during free-wheel operation.

As shown in FIG. 1, the assembly according to the invention, which is intended for a free-wheel device with wedging cams, comprises a spring 1 with a substantially cylindrical general shape, a plurality of wedging cams 2, only one of which is shown in the Figure, and a cylindrical cage 3. As shown in FIG. 2, the assembly is introduced between an internal sliding track or a shaft 4 and an external sliding track or a bore 5. The two sliding tracks 4 and 5 are normally concentric, their difference in diameter defining a clearance inside which the various wedging cams 2 are accommodated, only one of which is shown in the Figures.

To make matters clearer and clarify the description, it will be assumed by way of example that the shaft 4 defining the internal sliding track is fixed, while the external sliding track 5 is driven in rotation in the direction of the arrow 6. This free-wheel movement is allowed by the various wedging cams 2 which are in sliding contact with the two sliding tracks 4 and 5. A rotational movement in the opposite direction to the arrow 6 is, on the other hand, prevented owing to the special shape of the wedging cams 2 which thus tilt in the direction of the arrow 7, causing wedging and fixing of the two sliding tracks 4 and 5 relative to each other.

The spring 1 comprises a series of main undulations 8 provided, in the vicinity of their upper part, with an aperture 9 through which the cam 2 is able to pass.

The main undulation 8 has a rear part defining a flat portion 10 folded back towards the outside and constituting, moreover, the rear edge of the aperture 9. The main undulation 8 has, furthermore, a front part defining a flat portion 11 folded back towards the outside and being less inclined than the rear flat portion 10.

A tilting tongue 12 forms an integral part of the spring 1 on the side where the front flat portion 11 is located. The tilting tongue 12 is substantially flat and merely has one end 13 which is slightly rounded and is folded back towards the outside.

Figure 6:
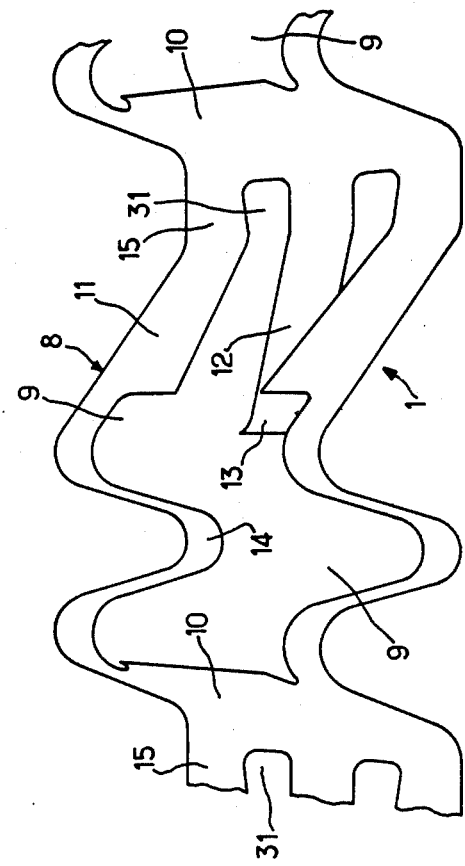
FIG. 6 is a partial perspective view of part of a spring obtained after forming and cutting of the developed strip shown in FIG. 5.

Each main undulation 8 has, in the vicinity of its top part, which is convex towards the outside, a secondary undulation 14, which is convex towards the inside and which exists on both sides of the aperture 9, as can be seen in particular in the perspective view shown in FIG. 6.

The main undulations 8 are separated by substantially cylindrical portions 15. During manufacture of the spring 1 and in particular during the forming stage, the substantially cylindrical portions 15, after mounting in the free-wheel device, are flat portions such that the main undulations 8 are located entirely on the same side of the plane defined by the portions 15.

Each wedging cam 2 possessing an identical structure has an external sliding surface 16 and an internal sliding surface 17. These surfaces may consist of cylindrical surfaces or of a combination of several cylindrical surfaces, the centres of curvature of which are staggered relative to each other so as to cause an increase in the overall dimensions of the wedging cam when tilted, so as to allow, as is usual, the wedging operation. The wedging cam 2 has, on its front inner side, a swollen portion 18 delimited on the front side of the cam by a flat-surface portion 19 against which the tilting tongue 12 normally bears with its end 13 during operation of the free-wheel device, as illustrated in FIG. 2. This flat-surface portion 19 is connected by means of a concave rounded portion 20 to the remainder of the front side 21 of the cam 2.

Before the assembly consisting of the spring 1, the cams 2 and the cage 3 is mounted between the sliding tracks 4 and 5, the end 13 of the tilting tongues 12 comes into contact with the front side of the cams 2 inside the rounded portion 20, as can be seen in FIG. 1.

The rear surface of the tilting cam 2 has, on the inner side, a flat-surface portion 22 forming an obtuse dihedral angle with a flat-surface portion 23 located on the outer side, thus defining an angle of intersection 24.

In the position before being mounted, shown in FIG. 1, the rear flat portion 10 of the spring 1 comes into full contact with the surface portion 22, while the end of the flat portion 10 bears against the dihedral angle 24 by the two flat-surface portions 22 and 23.

The apertures 25 of the cage 3 have dimensions such that the wedging cams 2 do not come into contact with the edges of these apertures 25 either during operation of the free-wheel device or even, before assembly, in the position shown in FIG. 1.

Before being mounted, the cams 2 are thus held in a precise radial and angular position by the spring 1. In fact, this precise position is defined by the full contact between the rear part 10 and the surface portion 22 and also by the contact between the end of the rear part 10 and the dihedral angle 24. In this position, the cams 2 are held elastically owing to the thrust exerted by the tilting tongue 12, the end of which bears against the rounded portion 20 of the front side of the cam 2. A thrust exerted on the external portion or on the internal portion of the cam 2 gives rise to a reaction force which tends to bring the cam back into the precise position of equilibrium defined by the spring and illustrated in FIG. 1. In this position, the cam 2 does not come into contact with the edges of the aperture 25 of the cage 3 and is therefore not supported by the cage 3. Similarly, the aperture 9 of the spring 1 is such that its front edge defined by the end of the flat portion 11 does not come into contact with the front side of the cam 2. The secondary undulations 14 give the spring a certain circumferential elasticity both in the position before mounting and during operation of the free-wheel device.

Owing to the precise radial and angular positioning of the cams 2 before being mounted, it is possible to obtain, with precision, the required diametral dimension for all the wedging cams 2. Consequently, mounting of the assembly shown in FIG. 1 between two sliding tracks 4 and 5 so as to form a free-wheel device such as that shown in FIG. 2 is made much easier and may even be fully automated, as mentioned above.

After being mounted, th cams 2 are also held elastically by the spring 1, as shown in FIG. 2. In this case and in the position shown, i.e. before the torque is taken up, the tilting tongues 12 bear with their ends 13 against the flat surface 19 of the swelling 18, exerting a tilting torque tending to make the cams 2 tilt towards the wedged position in the direction of the arrow 7. The end edge of the rear flat portion 10 comes into contact with the flat surface 23 of the rear side of the cam 2, forming, with the latter, an acute angle in view of the fact that the flat portion 10 is folded back towards the outside.

In practice, quite often the internal and external sliding tracks 4, 5 may not be exactly concentric. In this case, during operation, some wedging cams 2 are accommodated in a larger clearance, while other wedging cams are located in a smaller clearance.

Figure 3:
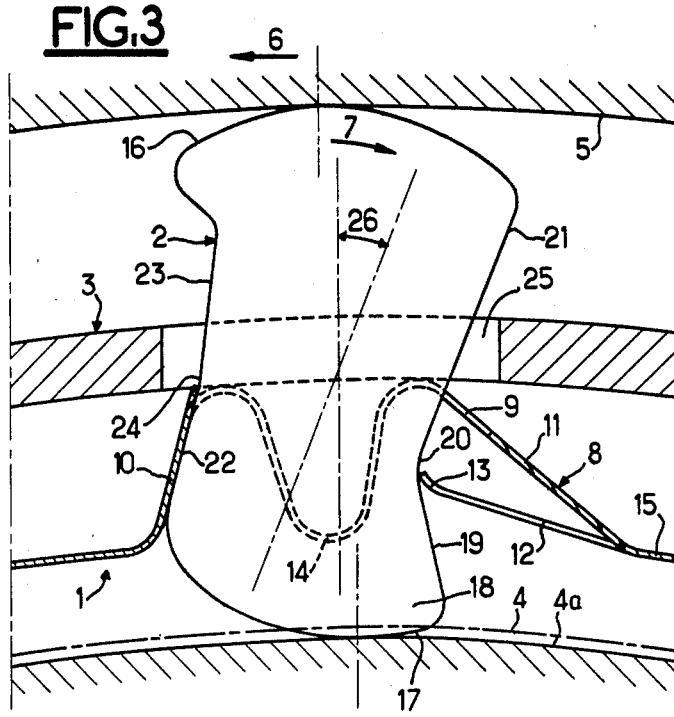
FIG. 3 is a view similar to FIG. 2, illustrating an example of operation where there is eccentricity with maximum clearance between the two sliding tracks; the Figure also shows the wedging cam before the torque is taken up, i.e. during free-wheel operation.

FIG. 3 shows the limit position of a wedging cam 2, before the torque is take up, during operation with eccentricity on the side where the clearance is greatest. The clearance shown in FIG. 3 is greater than that shown in FIG. 2. The sliding track, indicated by the line 4a in FIG. 3 is therefore located further towards the inside than the sliding track 4 shown as a broken line. In view of this greater clearance, the wedging cam 2 has tilted in the direction of the arrow 7. In order to avoid, when the torque increases, irreversible tilting outside of the active zone of the cam 2, the latter is "neutralised", i.e. its tilting movement, before the torque is taken up, is stopped in the predetermined limit position represented in FIG. 3 by the angle 26, owing to the flat rear portion 10 and the flat-surface portion 22, of the rear side of the cam bearing against each other. Any wedging cam 2 which reaches this limit position before the torque is taken up is locked in this position and is no longer able to tilt beyond this point. Wedging of the cam in question therefore cannot occur and consequently the torque cannot be taken up, thereby eliminating any further risk of irreversible tilting (a phenomenon known as "tilt over"). Neutralisation of certain wedging cams 2 of the free-wheel device is performed at the cost of a slight increase in the load on the other cams which remain active, but eliminates any risk of rapid wear of the free-wheel device, which would occur if the torque were taken up by cams which had tilted beyond the limit position shown in FIG. 3 and represented by the angle 26.

Figure 4:
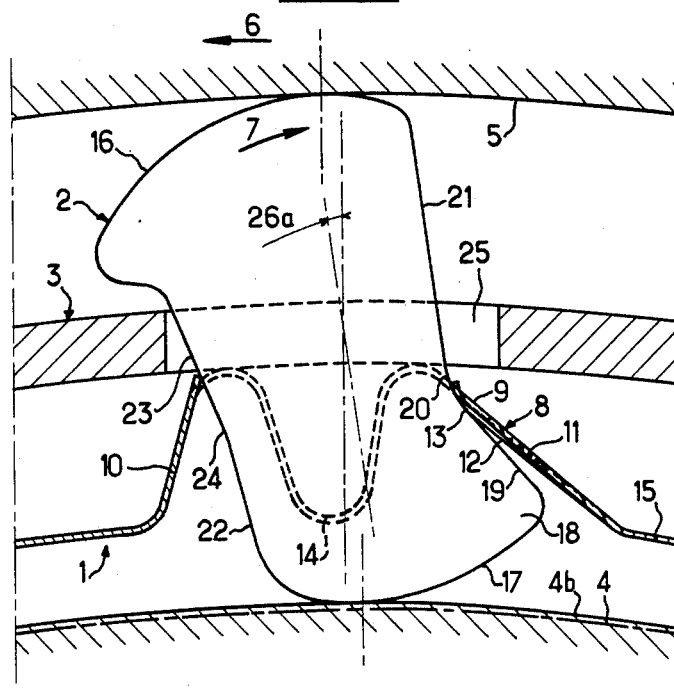
FIG. 4 is a view similar to FIG. 2, showing an eccentric arrangement with minimum clearance; the Figure shows the position of the wedging cam before the torque is taken up, i.e. during free-wheel operation.

In the opposite case, shown in FIG. 4, where the clearance is reduced to a mimimum, the line 4b of the internal sliding track being located further outside than that of the sliding track 4, the wedging cams 2 are located in an angular position 26a shown in FIG. 4. In the event of the cams 2 slipping, the latter tilt suddenly from the position where the torque is taken up, towards the free-wheel position beyond the position represented by the angle 26a. In this case, the tilting tongue 12 is pushed back completely into the same plane as the front flat portion 11 of the main undulation 8. Beyond this position, the entire front part 11 of the main undulation 8 reinforces the action of the tongue 12. Thus, the tilting movement of the cam 2 is effectively stopped, without excessive fatigue of the tongues 12.

In order to take maximum advantage of this characteristic feature, the slope of the flat-surface portion 11 is designed so that the maximum angle of flexure of the tongue 12 is compatible w1th the permissible stresses for the tongues 12. Moreover, the bearing action is performed by the flat surface 19 of the swelling 18 against the flat portion 11.

Figure 5:
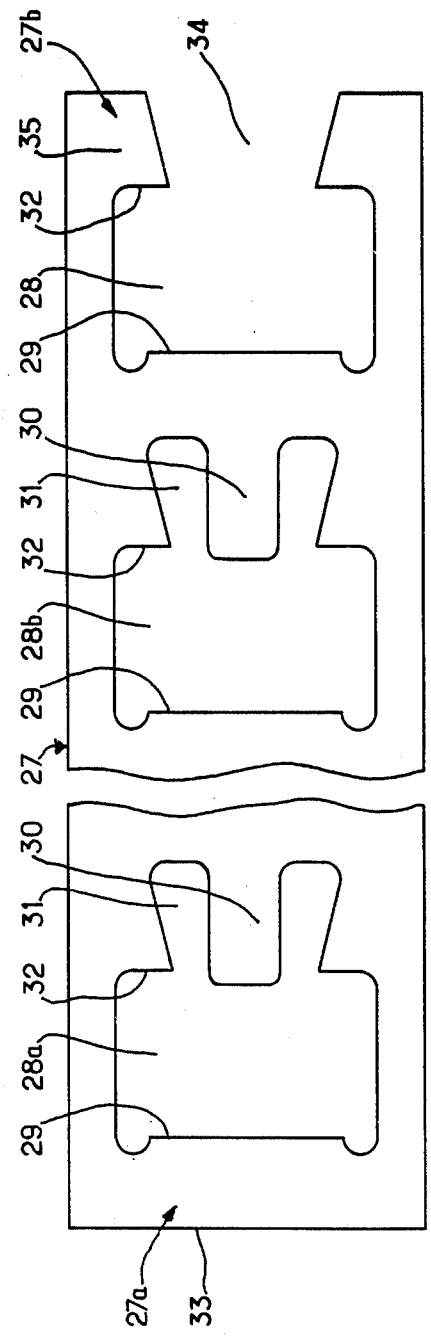
FIG. 5 is a partial view of a cut metal strip which, after forming and cutting, is used to obtain the spring shown in the preceding Figures; the Figure shows in particular the two ends of the metal strip.

FIG. 5 shows in more detail the structure of a metal strip 27 from which the spring 1 can be made, after being cut to shape by means of stamping and forming. It is possible to see the recesses 28 which have a general rectangular shape and form the apertures 9. The transverse edge 29 defines the end of the flat rear portion 10. On the opposite side there is a projection 30 from which the tilting tongue 12 is formed. The base of the projection 30 is integral with the strip 27 between two recesses 31 which lead into the recess 28 and the edges 32 of which, parallel with the edges 29, define the ends of the front flat portion 11.

One of the ends 27a of the strip 27 has a recess 28a which is completely closed, and ends in a transverse edge 33. On the other hand, the other end 27b has a recess 28b which is open at 34, in place of the missing projection 30.

When the assembly shown in FIG. 1 is mounted, the spring strip 3 is first of all rolled up in cylindrical fashion inside the cage 3 so that the two ends of the spring 1 overlap. The span of the apertures 9 of the spring in its unrestricted state is slightly greater than the span of the apertures in the spring after the latter has been mounted inside the bore of the cage 3.

Figure 7:
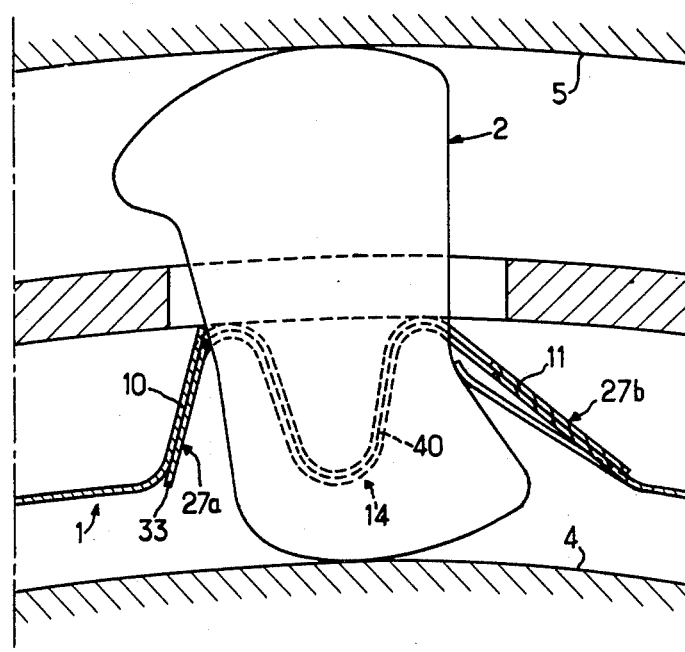
FIG. 7 is a partial cross-sectional view of a free-wheel device according to the invention, showing the means used to bias the spring.

With reference to FIG. 7, it can be seen that overlapping of the two ends 27a, 27b of the spring 1 is performed such that the first end 27a having a completely closed aperture is mounted on the inside, while the second end 27b is mounted on the outside. In this way, the tangential forces due to circumferential biasing of the spring are absorbed by surfaces bearing fully against each other, close to the radial direction. In fact, absorption of the circumferential biasing is performed mainly by contact between the rear portions 10 of the two ends which overlap and also between the front portions 40 of the secondary undulations 14. This result would not be achieved if, on the contrary, the first end 27a were placed on the outside and the second end 27b were placed on the inside. In this case, in fact, the front flat portions 11 which are less inclined radially would not be able to withstand the circumferential biasing which would thus be partly absorbed by the cam located at the point where overlapping occurs. The forces exerted by the spring on this cam would be likely to prevent it operating properly.

Owing to this biasing of the spring 1 inside the cage 3, the spring 1, after mounting, has a known fixed diametral dimension which is defined precisely by the bore of the cage 3, irrespective of any fluctuations in the dimensions of the span of the apertures 9 in the spring.

Figure 8:
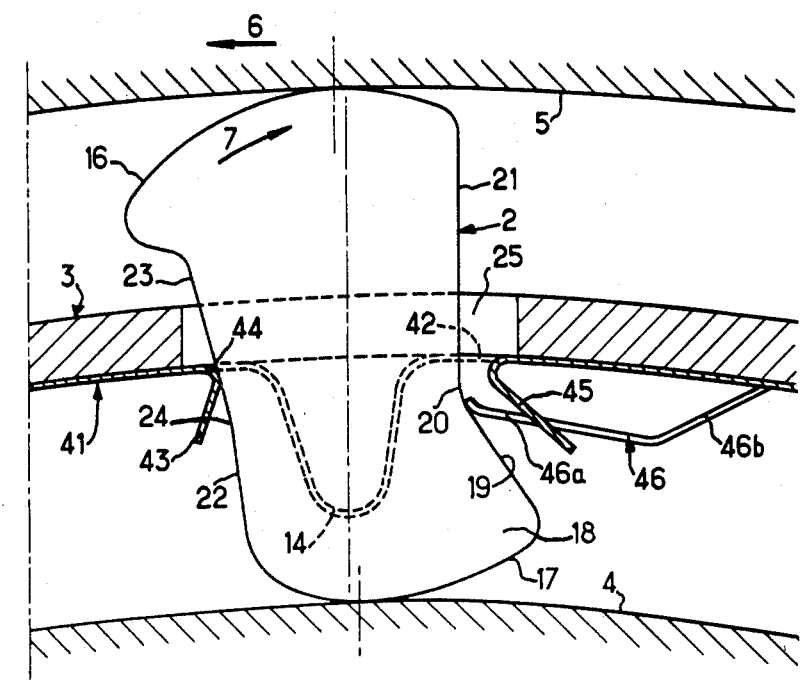
FIG. 8 is a view similar to FIG. 2, showing a variation of the invention.

The variation illustrated in FIG. 8, in which similar parts have the same reference numbers, is shown in the position before the torque is taken up, as in the example shown in FIG. 2. In this variation, the spring 41 has a general cylindrical structure, without the main undulations of the spring in the variation of the preceding Figures. The apertures 42 are enclosed on each side by an undulation 14 similar to the secondary undulations of the preceding embodiment. The external cylindrical surface of the spring 41 is in contact with the bore of the cage 3.

The rear edge of the aperture 42 has a flat portion 43 folded back towards the inside. The edge of the fold 44 is able to bear against the dihedral angle 24 formed by the two flat-surface portions 22 and 23 of the cam 2, while the flat portion 43 comes into full contact with the flat surface 22 in the position assumed before being mounted (not shown in FIG. 8).

The front edge of the aperture 42 does not come into contact with the front side of the cam 2. A flat portion 45 folded back towards the inside is able to come into contact with the flat-surface portion 19 of the cam 2 when the tilting tongue 46 is completely pushed back. The tilting movement of the cam 2 is thus effectively stopped without excessive wear of the tongues 46, in the same manner as in the preceding variation. It will be noted that the tilting tongue 46 is bent and has two substantially flat portions 46a and 46b, its end being able to co-operate, as in the preceding variation, with the rounded portion 20 of the front side of the cam 2.

Apart from this difference in the structure of the spring 41, operation of the assembly is the same as in the preceding variation. In particular, assembly is performed in the same manner by overlapping the two ends of the spring, achieving the same advantages as before.

Figure 9:
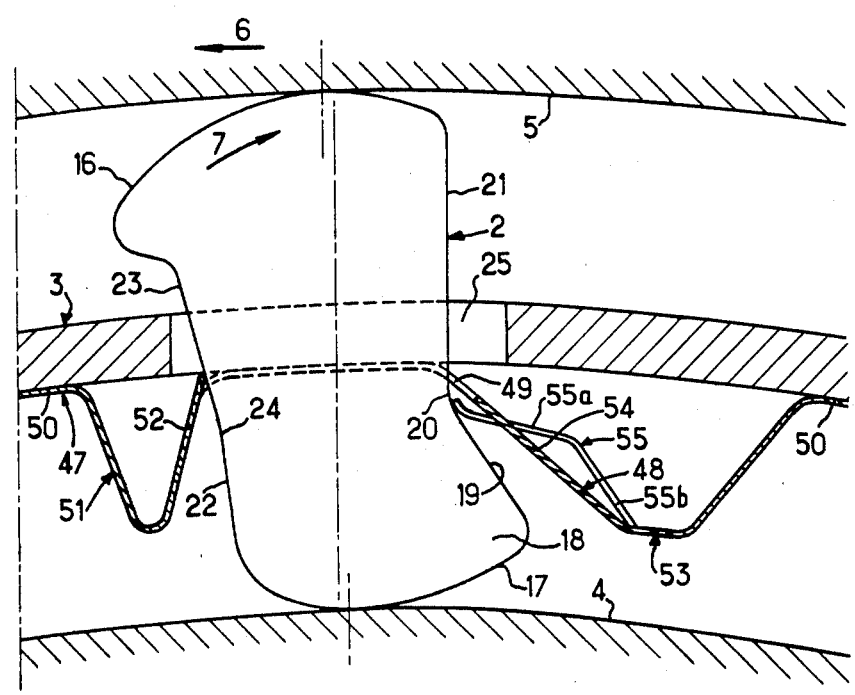
FIG. 9 is a view similar to FIG. 2, showing another variation of the invention.

FIG. 9 shows yet another variation. In this Figure, identical parts have the same reference numbers.

In this second variation, the spring 47 has main undulations 48, at the top of which apertures 49 for the cams 2 are provided. Contrary to what was the case in the variation shown in FIGS. 1 to 7, the cylindrical portions 50 of the spring 47 are in contact with the bore of the cage 3. In this variation in the form shown, the spring 47 has no secondary undulations in line with the apertures 49. However, a first secondary undulation 51 located on the rear side comprises the flat portion 52 defining the rear edge of the aperture 49. This flat portion 52 is folded towards the outside, as can be seen in FIG. 9. As was the case in the variations shown in FIGS. 1 to 7, the end edge of the portion 52 is able to co-operate with the dihedral angle 24, while surface-to-surface contact is established between the flat portion 52 and the flat surface 22 of the cam 2 in the position occupied by the latter before the assembly is mounted between the shaft 4 and the bore 5. A secondary undulation 53 located on the front side comprises the front flat portion 54 which is able to bear against the flat surface 19 of the cam 2 when the tilting tongue 55 is completely pushed back.

The tongue 55 has a bent structure and comprises a flat portion 55a connected to a second flat portion 55b. The end of the tilting tongue is able to co-operate with the rounded portion 20 of the front side of the cam, as in the preceding variations.

This second variation has the same advantages as in the preceding variations. The spring is mounted, as in the preceding variations, by overlapping its two ends.

I claim:

1. A spring assembly for a free-wheel device, comprising, a plurality of wedging cams which are positionable in an annular clearance having a maximum height and a minimum height, said clearance being defined between an inner track and an outer track which are eccentric relative to each other, each of said wedging cams having a front side with a substantially flat front surface portion and a rear side with a substantially flat rear surface portion, each wedging cam being tiltable, while the device is in a free-wheel condition and the cams are located between said tracks, in a first direction when said cam is near said maximum clearance height and in a second opposite direction when said cam is near said minimum clearance height, said spring assembly comprising:

a cut-out metallic strip means for retaining said wedging cams before and after the cams are inserted into a free-wheel device, said metallic strip having a plurality of apertures which each have a rear edge and a front edge, said cams passing through and being held in said apertures, each said rear edge having a substantially flat stop portion adapted to lie substantially flat against said substantially flat rear surface portion of a wedging cam before the cams and said metallic strip have been inserted into said free wheel device and when the cam is tilted in said first direction, thus limiting the movement of said cam in said first direction, each said front edge having a substantially flat stop portion and a cam tilting tongue, said cam tilting tongue being engageable with the front side of the wedging cam, said flat stop portion at the front edge of the aperture being engageable with said substantially flat front surface portion of the wedging cam when the cam is tilted in said second direction, thus limiting the movement of said cam in said second direction, said tongue being elastically deformed by said cam when said cam is tilted in said second direction.

2. A spring assembly according to claim 1 for use with wedging cams which have their rear sides provided with two flat surface portions which form a dihedral angle, said flat stop portion of the rear edge of each aperture being positioned to bear against said dihedral angle before the strip and the cams thereon are installed between inner and outer tracks.

3. A spring assembly according to claim 1 for a free-wheel device which has wedging cams which have front sides with concave rounded portions, each said tilting tongue being bent in an outward direction from the strip and having an end positioned to contact said concave rounded portion of the front side of a cam.

4. A spring assembly according to claim 1 wherein each aperture has dimensions which locate the front end of each aperture at a position which is normally spaced from the front side of a cam therein, and the cam is held between the rear edge of the aperture and the tilting tongue.

5. A spring assembly according to any one of claims 1-4 wherein the flat stop portion of the rear edge of each aperture is an outwardly bent portion of the metallic strip.

6. A spring assembly according to any one of claims 1-4 wherein the flat stop portion of the rear edge of each aperture is an inwardly bent portion of the metallic strip.

7. A spring assembly according to claim 1 wherein the flat stop portion at the front edge of each aperture is an inwardly bent portion of the metallic strip.

8. A spring assembly according to claim 1 wherein the tilting tongue has at least one substantially flat portion.

9. A spring according to claim 1 wherein the tilting tongue is bent inwardly from the metallic strip, said tongue having an end which is slightly rounded.

10. A spring assembly according to claim 1 wherein the metallic strip has a substantially cylindrical portion, and the tilting tongue is integral with said substantially cylindrical portion.

11. A spring assembly according to claim 1 wherein the metallic strip has a series of main undulations which are separated by substantially cylindrical portions, said undulations having tops where said apertures are located for receiving the cams.

12. A spring assembly according to claim 11 wherein each of the main undulations has a secondary undulation which is located on each side of the corresponding aperture.

13. A spring assembly according to claim 1 including a cage, said cage having apertures which receive said cams, said apertures of the cage having dimensions such that the cams are unsupported by the cage, said metallic strip and said cage being concentric.

14. A spring assembly according to claim 13 wherein the metallic strip is precompressed circumferentially inside the cage, said apertures of the metallic strip in an uncompressed state having a span which is greater than their span when the metallic strip is compressed inside the cage with the cams extending through the cage and the metallic strip.

15. A spring assembly according to claim 14 wherein the metallic strip has two ends which overlap each other, each of said ends having apertures which overlap each other and flat stop portions at the rear edges of the apertures, said flat stop portions overlapping each other and being bent toward the rear edges of the apertures and being in contact with each other to bias the metallic strip.

16. A spring assembly according to claim 15 wherein the metallic strip has secondary undulations at the overlapping apertures, said secondary undulations being in contact with each other to augment the biasing of the metallic strip.

17. A spring assembly according to claim 15 wherein a first end of the metallic strip has an aperture and an associated tilting tingue, and a second end of the metallic strip has an aperture which is not associated with a tilting tongue, said first end being positioned interiorly of the second end.

18. A free-wheel device including a shaft, a bore and a spring assembly according to claim 1, said shaft and bore forming said inner and outer tracks, said wedging cams being located between the shaft and the bore, said cams being tiltable in a first direction to wedge themselves against said tracks to prevent relative rotation between the shaft and the bore, said cams being tiltable in a second direction to positions where they slidably engage said tracks to allow free rotation between the shaft and the bore in a single direction.

* * * * *